US010218297B2

(12) United States Patent
Griesmann et al.

(10) Patent No.: US 10,218,297 B2
(45) Date of Patent: Feb. 26, 2019

(54) ADJUSTMENT DEVICE HAVING A CONTROL UNIT PROVIDED WITH A BRIDGE CIRCUIT

(71) Applicant: BROSE FAHRZEUGTEILE GMBH & CO. KOMMANDITGESELLSCHAFT, BAMBERG, Bamberg (DE)

(72) Inventors: Manuel Griesmann, Bamberg (DE); Olaf Kriese, Coburg (DE); Roland Kalb, Grossheirath (DE)

(73) Assignee: Brose Fahrzeugteile GMBH & Co. Kommanditgesellschaft, Bamberg, Bamgerg (DE)

( * ) Notice: Subject to any disclaimer, the term of this patent is extended or adjusted under 35 U.S.C. 154(b) by 0 days.

(21) Appl. No.: 15/327,635

(22) PCT Filed: Jul. 7, 2015

(86) PCT No.: PCT/EP2015/065447
§ 371 (c)(1),
(2) Date: Jan. 19, 2017

(87) PCT Pub. No.: WO2016/012231
PCT Pub. Date: Jan. 28, 2016

(65) Prior Publication Data
US 2017/0214344 A1 Jul. 27, 2017

(30) Foreign Application Priority Data
Jul. 22, 2014 (DE) .................. 10 2014 214 239

(51) Int. Cl.
H02P 7/03 (2016.01)
H02P 7/28 (2016.01)
(Continued)

(52) U.S. Cl.
CPC ............... *H02P 7/04* (2016.02); *B60S 1/026* (2013.01); *E05F 15/695* (2015.01); *G02F 1/163* (2013.01);
(Continued)

(58) Field of Classification Search
CPC ..... A61B 17/1626; B26B 19/00; B26B 19/06; B26B 19/38; B26B 19/388
(Continued)

(56) References Cited

U.S. PATENT DOCUMENTS 4,562,387 A 12/1985 Lehnhoff
4,575,662 A 3/1986 Lehnhoff
(Continued)

FOREIGN PATENT DOCUMENTS

CN 201517333 U 6/2010
CN 203172564 U 9/2013
(Continued)

OTHER PUBLICATIONS

CN first Office action dated Nov. 3, 2017 cited in corresponding CN Application No. 201580040354.1, 5 pages.

Primary Examiner — Kawing Chan
Assistant Examiner — Bradley Brown
(74) Attorney, Agent, or Firm — Lewis Roca Rothgerber Christie LLP

(57) ABSTRACT

An adjustment device for a closure element on a vehicle, such as e.g. a window pane, a sunroof or a convertible top, is provided. The closure element is adjustable between an open and a closed position by means of the adjustment device, wherein the adjustment device includes a drive motor and an electronic control unit for adjusting the closure element and the control unit comprises a bridge circuit, in order to supply the drive motor with electric power and control the rotational speed and the direction of rotation of (Continued)

a drive element of the drive motor to be coupled with the closure element. The bridge circuit is connected with at least one additional load of the vehicle, such as e.g. a window heater, and is formed and provided to control the energization of the at least one additional electronic load.

10 Claims, 4 Drawing Sheets

(51) Int. Cl.
| | | |
|---|---|---|
| *G02F 1/163* | (2006.01) | |
| *B60S 1/02* | (2006.01) | |
| *E05F 15/695* | (2015.01) | |
| *B60J 1/12* | (2006.01) | |
| *B60J 7/043* | (2006.01) | |
| *B60J 7/08* | (2006.01) | |

(52) U.S. Cl.
 CPC . *H02P 7/28* (2013.01); *B60J 1/12* (2013.01); *B60J 7/043* (2013.01); *B60J 7/08* (2013.01)

(58) Field of Classification Search
 USPC .................................................. 318/283, 504
 See application file for complete search history.

(56) References Cited

U.S. PATENT DOCUMENTS

| | | | | |
|---|---|---|---|---|
| 5,920,165 | A * | 7/1999 | Mane | .................... B60R 1/0602 |
| | | | | 318/280 |
| 6,315,418 | B1 | 11/2001 | Tornare | |
| 2002/0057082 | A1 * | 5/2002 | Hwang | .................. H02M 3/158 |
| | | | | 323/284 |
| 2004/0036430 | A1 | 2/2004 | Komaromi et al. | |
| 2008/0129234 | A1 | 6/2008 | Buente et al. | |

FOREIGN PATENT DOCUMENTS

| | | |
|---|---|---|
| CN | 203613935 U | 5/2014 |
| DE | 10-2006-049490 A1 | 4/2008 |
| EP | 1056620 A1 | 12/2000 |
| EP | 1369987 A2 | 12/2003 |
| JP | 2010-110084 A | 5/2010 |

\* cited by examiner

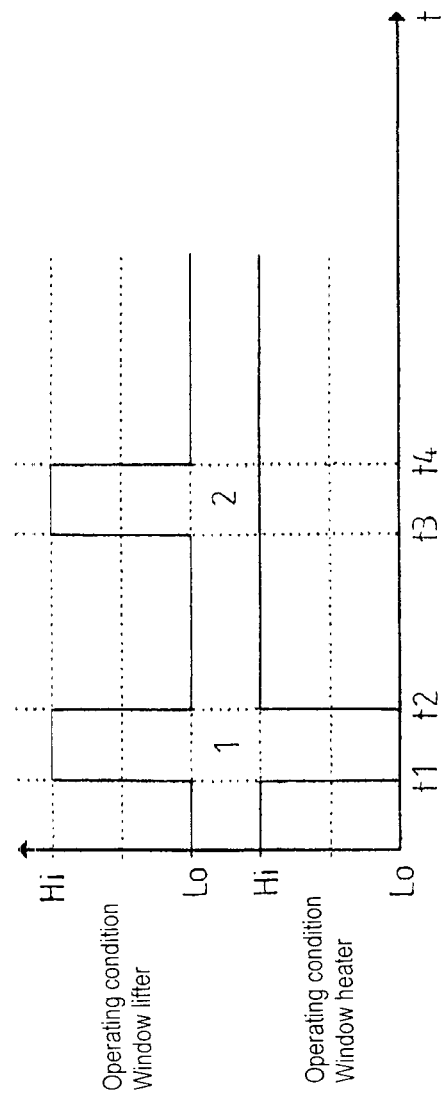

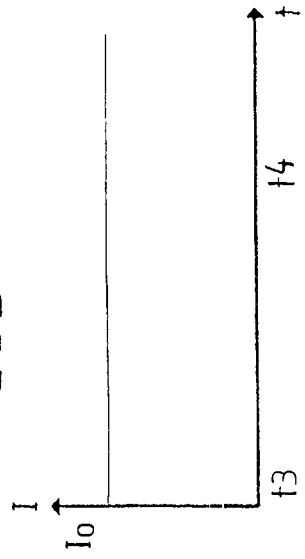
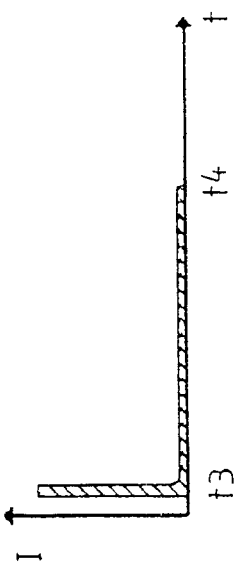
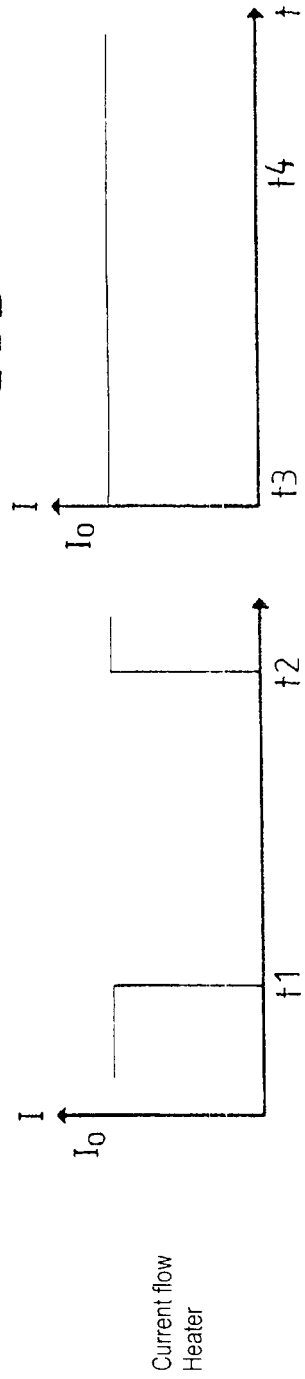
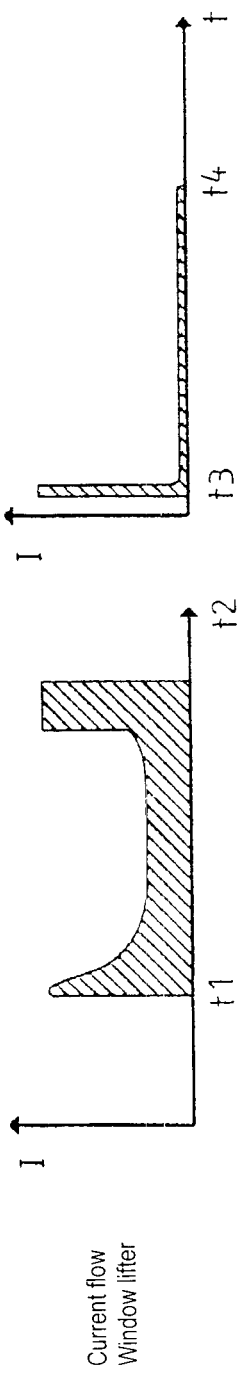
FIG 3A — Current flow Heater
FIG 3B
FIG 4A — Current flow Window lifter
FIG 4B

ADJUSTMENT DEVICE HAVING A CONTROL UNIT PROVIDED WITH A BRIDGE CIRCUIT

CROSS-REFERENCE TO A RELATED APPLICATION

This application is a National Phase Patent Application of International Patent Application Number PCT/EP2015/065447, filed on Jul. 7, 2015, which claims priority of German Patent Application Number 10 2014 214 239.3, filed on Jul. 22, 2014, the entire contents of all of which are incorporated herein by reference.

BACKGROUND

The present invention in particular relates to an adjustment device for a closure element on a vehicle.

Such closure element for example can comprise a window pane, a sunroof or a convertible top. Usually such closure elements nowadays are adjustable between a maximally open and a maximally closed position by external power via a drive motor of an adjustment device. For controlling the adjusting movement an electronic control unit is provided, which serves to control the rotational speed and the direction of rotation of a drive element of the drive motor coupled with the closure element. Such drive element, for example in the form of a drive shaft of the drive motor, then is coupled with the closure element via an adjustment mechanism of the adjustment device, in order to transmit an adjustment force to the closure element.

In particular in adjustment devices in the form of a vehicle window lifter it is known that an electronic control unit for controlling the drive motor comprises a bridge circuit, in order to supply the drive motor with electric power and control the rotational speed and the direction of rotation of the drive element. A typical bridge circuit here comprises four transistors, preferably four voltage-controlled field effect transistors.

In addition, further loads are provided on a vehicle, whose energization can be controlled via additional controllers and circuits separate from the adjusting movement of a closure element. One example of this is the window heater of a rear and/or side window of the vehicle or of a mirror. In practice, a control of the energization of a separate window heater for example is effected by means of at least one additional transistor.

SUMMARY

It now is an object of the present invention to provide a possibility of reducing costs and assembly effort with regard to the electronics to be provided within a vehicle and here in particular in connection with an adjustment device rely on the power-operated adjustment of a closure element.

This object is solved with an adjustment device as described herein or a control unit as described herein.

According to the invention it is provided to likewise connect the bridge circuit of an electronic control unit, which is provided to supply the drive motor of the adjustment device with electric power and to control the rotational speed and the direction of rotation of a drive element of the drive motor to be coupled with the closure element, with at least one additional load of the vehicle and to likewise utilize the same for controlling the energization of this additional load.

Via the bridge circuit controlling the adjusting movement of the closure element (and via one and the same voltage source) at least one additional load of the vehicle thus is selectively supplied with power as required. The additional load thus can be switched active and inactive via the same bridge circuit. By means of the bridge circuit for the closure element switching and/or voltage conditions of an additional load, for example of a mirror and/or window heater and/or an electrochromic glass, thus can be controlled as well.

By utilizing the bridge circuit to be provided anyway for the adjustment device of the closure element to control the energization of the at least one additional electric load, additional circuit elements, such as for example semiconductor components, can be omitted, which otherwise would have to be provided for controlling the energization of the load. This regularly also involves a smaller line cross-section of the feed lines and a reduction of disturbing electric or electromagnetic effects.

In one exemplary embodiment the drive motor of the adjustment device is interconnected in a bridge branch of the bridge circuit and the additional load is connected to the bridge branch. In particular with such a formation of the bridge circuit it furthermore is preferably provided that the bridge circuit comprises four transistors via which in particular a rotation of the drive element of the drive motor in the one or in the other direction of rotation can be controlled depending on the actuation. Such bridge circuit with four identical transistors for the control of a drive motor for example is well known in connection with a vehicle window lifter for an adjustable closure element in the form of a side window. There are preferably used voltage-controlled transistors, thus so-called field effect transistors. In one exemplary embodiment, which makes use of the solution according to the invention, it now is provided that one of the transistors of the bridge circuit also is actuatable for energizing the additional load. The additional load consequently is connected with the bridge circuit including four transistors such that by connecting through merely one of the transistors an energization of the additional load is achieved. For example via a corresponding actuation of this transistor the additional load also is supplied with power and activated as required.

The transistor actuatable for energizing the additional load can be designed for a larger power consumption than the remaining transistors of the bridge circuit. The transistor actuatable for energizing the additional load thus in other words has a larger current-carrying capacity than the remaining transistors. Such configuration of a bridge circuit with three identical transistors and one "stronger" transistor, which durably is designed for a higher power consumption by the additional load, is recommendable for example in a vehicle window lifter. In connection with the solution according to the invention one of four transistors of a window lifter bridge circuit here is designed for a larger power consumption and is utilized for the control and energization of a side window heater. The bridge circuit for the control of an adjusting movement of a vehicle side window thus likewise is utilized here to realize the control of a window heater for the adjustable side window.

In one exemplary embodiment the bridge circuit is formed and provided to energize the additional load when the drive element of the drive motor is driven to rotate in a particular direction of rotation. The bridge circuit consequently here is formed and interconnected with the additional load such that an energization of the additional load automatically is effected when the drive element is rotated in a particular direction of rotation by means of a motor. In such exemplary embodiment the additional load preferably is interconnected with the bridge circuit and connected to a bridge branch of the bridge circuit such that on energization of the drive motor for adjusting the closure element in a particular direction of rotation (one of two possible directions of rotation) the additional load is connected in series with the drive motor. By saving additional circuit elements for controlling the energization of the at least one additional load it here is accepted that the energization of the load is coupled directly with the actuation of the drive motor for adjusting the closure element. Here, for example, one and the same transistor of a bridge circuit is actuated both for the adjustment of the closure element in one (first) of two possible adjustment directions and for the energization of the additional load.

Alternatively or in addition the bridge circuit can be formed and provided to interrupt an energization of the additional load as long as the drive element of the drive motor is driven to rotate in a particular direction of rotation. In this case, the bridge circuit is constructed such that the energization of the load is interrupted for the time period in which an adjustment of the closure element in a particular adjustment direction is effected via the drive motor. When the additional load for example is energized and switched on via the bridge circuit, its energization is interrupted during the adjustment of the closure element in one (second) of the (two possible) adjustment directions, as for the adjustment in this (second) adjustment direction that transistor of the bridge circuit is switched inactive/not switched or not actuated, whose actuation is necessary for the energization of the additional load.

In a design variant based thereon the bridge circuit for example is formed and interconnected with the additional load such that a load energized or switched on via the bridge circuit still remains energized or switched on when the drive motor adjusts the closure element in a first adjustment direction, but the energization of the load is interrupted or the load is switched off when the closure element is adjusted in the other, second adjustment direction via the drive motor.

As already mentioned above, the closure element for example can comprise a window pane, a sunroof or convertible top of a vehicle. In one design variant the closure element comprises a motor-adjustable liftgate, wherein the bridge circuit preferably is provided for actuating at least one spindle drive for the adjustment of the liftgate.

The additional load for example can comprise a heating element, in particular a mirror and/or window heater and/or an electrochromic glass—preferably an electrochromic glass of a side or rear window and/or of a mirror of the vehicle.

In the case of a control and energization of an electrochromic glass via the bridge circuit likewise provided for controlling the drive motor it can be provided that a possible interruption of the energization of the load, which may be necessary due to the circuitry during an adjustment of the closure element in a particular adjustment direction, does not visibly influence the degree of transparency of the electrochromic glass for a user or at least in a way hardly visible with the naked eye. The electrochromic glass and/or its electronic control unit can be formed such that an interruption of the energization for a time period in which under normal conditions the closure element is adjusted from its maximally closed into its maximally open position or vice versa causes almost no change of the degree of transparency of the glass visually perceptible for a user. The electrochromic glass, the bridge circuit and the adjustment speed of the closure element (in at least one adjustment direction), which is specified via the drive motor, here are adjusted to each other such that the closure element reaches the respective end position to be moved to, i.e. its maximally closed or maximally open position, without the interruption of the energization of the electrochromic glass accompanying the adjustment leading to a visible change of the transparency of the glass. In one exemplary embodiment, for example, an electrochromic glass reacts so slowly to an interruption of the applied voltage that during a maximum possible adjustment of the closure element almost no change of the transparency of the glass recognizable for the user occurs. Correspondingly, in an adjustment device in the form of a vehicle window lifter no change of the transparency of the side window to be adjusted, which is provided with an electrochromic glass, is recognizable for a user during a complete stroke of the window.

Alternatively or in addition, an internal timer can be provided in one variant, which is started in response to an actuation command for darkening the electrochromic glass. Only after expiration of a delay time period specified by the timer is an actuation of the electrochromic glass effected, in order to darken the same. The delay time period can be preset such that it at least corresponds to the time period required for adjusting the closure element into an end position, i.e. the time period for a maximum stroke. Before a desired darkening, the respective window thus in any case reaches its respective end position by external power, before the electrochromic glass can be actuated at all for darkening purposes. The delay time period also can be variable and/or changeable, in particular in dependence on a current adjustment position of the closure element. This delay time period—e.g. not more than 3 sec on closing of a vehicle window pane—can be accepted in view of the sluggishness of an electrochromic glass, without noticeably reducing the comfort for a user.

In one exemplary embodiment it can be provided on the basis of the solution according to the invention that an individual controller is provided for controlling the drive motor and for controlling the energization of the at least one additional load. By utilizing an individual bridge circuit for both control purposes, the control functions can easily be combined in one individual controller, in order to reduce costs and assembly effort.

In accordance with the invention there is also proposed an electronic control unit for the power-operated adjustment of a closure element on a vehicle, e.g. in the form of a controller.

The control unit comprises a bridge circuit, in order to supply a drive motor with electric power and control the rotational speed as well as the direction of rotation of a drive element of the drive motor to be coupled with the closure element. Furthermore, the bridge circuit is connectable with at least one additional electric load of the vehicle and is formed and provided to control the energization of the at least one additional electric load.

An electronic control unit according to the invention thus can be used in particular in an adjustment device according to the invention, so that the advantages and features mentioned in this respect also apply for an electronic control unit according to the invention and vice versa.

Correspondingly, in one design variant of the control unit the bridge circuit preferably comprises four transistors via which in particular a rotation of the drive element of the drive motor in the one or in the other direction of rotation can be controlled depending on the actuation. One of the transistors then can be actuatable for energizing the additional load and can be designed for a larger power consumption than the remaining transistors of the bridge circuit.

BRIEF DESCRIPTION OF THE DRAWINGS

Further advantages and features of the invention furthermore will become apparent from the following description of exemplary embodiments with reference to the Figures.

FIG. 2 shows a diagram in which the operating conditions of the window lifter or its drive motor and the window heater with different adjusting movements of the window pane are plotted over the time.

FIGS. 3A-3B show current-time diagrams to illustrate the current flow for the heater switched on with the different adjusting movements of the window pane.

FIGS. 4A-4B show current-time diagrams to illustrate the current flow for the drive motor on adjustment of the window pane in the one and the other adjustment direction.

DETAILED DESCRIPTION

Figure 5:
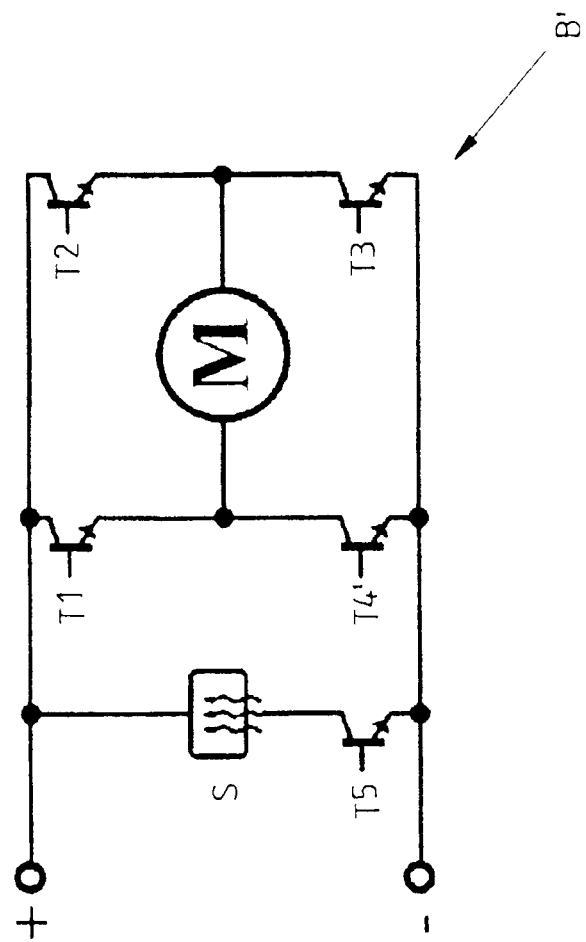
FIG. 5 shows a bridge circuit known from the prior art for a vehicle window lifter with separate transistor for controlling the energization of a window heater.

FIG. 5 by way of example shows a bridge circuit B' known from the prior art for an electronic control unit for controlling a drive motor M of a vehicle window lifter and a separate control circuit with a transistor T5 for controlling the energization of a window heater S.

The bridge circuit B' comprises four identically formed transistors T1, T2, T3 and T4', which in dependence on the actuation of the respective transistors T1 to T3 and T4' permit a regulation of the rotational speed and direction of rotation of a drive element driven by the drive motor M, for example in the form of a drive shaft. The drive element of the drive motor M is coupled with the window pane to be adjusted via a non-illustrated adjustment mechanism, so that depending on the direction of rotation of the drive element the window pane can be lowered in a first adjustment direction and can be lifted in a second adjustment direction opposite thereto. Such adjustment mechanism for example can comprise at least one carrier connected with the window pane, a guide rail on which the carrier is shiftably guided, and a Bowden cable which is connected with the carrier and is driven by the drive motor M.

The additional window heater S for heating the window pane to be adjusted (or another window pane) is controlled via an additional semiconductor component in the form of the transistor T5. This transistor T5 is actuated separately, in order to regulate the energization of the window heater S and switch the window heater S on and off.

Figure 1:
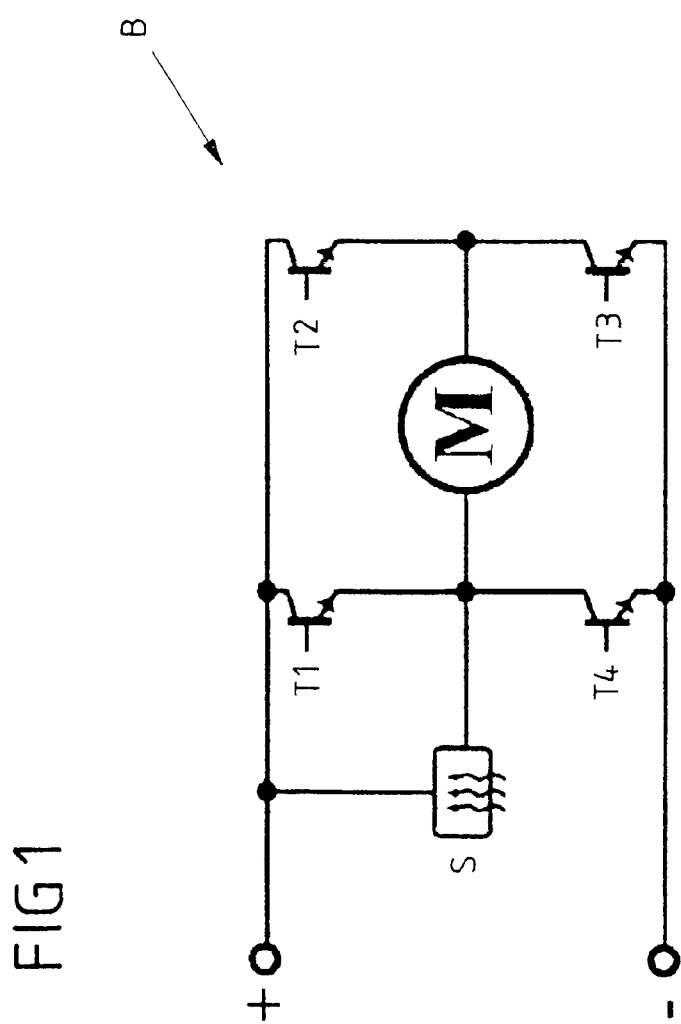
FIG. 1 by way of example shows a bridge circuit of an adjustment device according to the invention in the form of a vehicle window lifter, in which the bridge circuit likewise is formed to control the energization of a window heater.

FIG. 1 shows an exemplary embodiment for a bridge circuit B via which not only the control of the adjusting movement of the window pane is effected, but via which the energization of the window heater S likewise can be controlled. The transistor T4' of the bridge circuit B' of FIG. 5 here is replaced by a "stronger" transistor T4 in the bridge circuit. The window heater S now is interconnected with the bridge circuit B and its transistors T1 to T4 such that by actuating the transistor T4 the energization of the window heater S likewise can be controlled. For this purpose, the window heater S is connected with that bridge branch of the bridge circuit 1 in which the drive motor M is arranged.

Depending on whether the window pane is to be lifted or lowered via the drive motor M, different pairs of transistors T1 to T4 are actuated. At the same time, however, the actuation of the transistor T4 also involves the activation and/or energization of the window heater S. The transistors T1 to T4 here are voltage-controlled, so that for the different functions the voltage conditions of the individual components—transistors T1 to T4, window heater S and drive motor M—listed in the Table included below are obtained:

|  | T1 | T2 | T3 | T4 | S | M |
|---|---|---|---|---|---|---|
| Lifting | 1 | 0 | 1 | 0 | 0 | 1 |
| Lowering | 0 | 1 | 0 | 1 | 1 | 1 |
| Heating | 0 | 0 | 0 | 1 | 1 | 0 |

The Table for example reveals that for energizing and activating the window heater S via the provided voltage source merely the transistor T4 is to be actuated and to be switched correspondingly. For lifting the window pane and hence for its adjustment in the second adjustment direction the transistors T1 and T3 are actuated. For lowering the window pane, on the other hand, the two other transistors T2 and T4 are actuated, so that the drive motor M adjusts the window pane in the opposite first adjustment direction (downwards). By actuating the transistors T2 and T4 for lowering the window pane, the window heater S and the drive motor M are connected in series. On lowering the window pane the window heater S here consequently also always is separately supplied with power by means of the switched transistor T4, via which the energization of the window heater S also is controllable separately, i.e. without energization of the drive motor M.

In this way, the operating conditions as shown in FIG. 2 for the drive motor M or the window lifter including the drive motor M and the window heater S are obtained, when the window heater S already is energized via the actuation of the one transistor T4. When in this case the window lifter is actuated to close the window pane at a time t1, the transistors T1 and T3 are actuated for this purpose. The operating condition of the window lifter thereby changes from an inactive operating condition "Lo" to an active operating condition "Hi". At the same time—due to the through-connection of the transistor T4 to be maintained no longer for lifting the window pane—the energization of the window heater S is interrupted via the bridge circuit B. When the lifting of the window pane is terminated at a time t2, the window lifter again is inactive. For this very time period from t2-t1 the energization of the window heater S accordingly is interrupted and the window heater S is switched inactive.

When the window lifter on the other hand is actuated to open the window at a time t3 with the window heater S switched on, the window heater S remains energized and switched on. Thus, no change of the operating condition of the window heater S occurs for the duration of lifting of the window pane by the drive motor M (time period t4-t3).

An advantage of the design variant shown here, in which the window heater S is switched inactive on lifting of the window pane, will become apparent with reference to FIGS. 3A to 3B and 4A to 4B. The power consumption of the drive motor M is distinctly greater on lifting of the window pane than on lowering of the window pane. On lifting of the window pane an adjusting movement is effected against the weight force acting on the window pane. In addition, a larger adjustment force must be applied before reaching the completely closed position, in order to move the upper edge of the window pane into a seal. These adjustment forces which are higher than on lowering of the window pane are illustrated with reference to FIG. 4A in which the course of the motor current I of the drive motor M, which is proportional to the adjustment force to be applied, is represented over the time period t2-t1 for a complete window stroke on lifting of the window pane. In FIG. 4B, this current flow likewise is compared with the current flow at the drive motor M on lowering of the window pane for the time period t4-t3 for a complete window stroke.

This reveals that the power consumption at the drive motor M—over a complete window stroke—is higher by a multiple on lifting of the window pane than on lowering of the window pane.

FIGS. 3A and 3B furthermore illustrate the current flow at the window heater S for lifting and lowering of the window pane in said time periods t2-t1 and t4-t3. This again illustrates how the energization of the window heater S is interrupted as soon as the drive motor M is actuated for lifting the window pane via the bridge circuit B. The current intensity measurable at the heater S falls from a value $I_0$ to 0. Now, it thereby is achieved however that at an operating condition of the drive motor M, in which the same applies a comparatively large power, the bridge circuit B and in particular the transistor T4 is not additionally loaded by the activated window heater S. Moreover, it rarely occurs in practice that with an open window pane the window heater S is activated. The window heater S clearly frequently is activated when the window pane is closed.

On the basis of the solution according to the invention, analogous to an actuation of a window heater S, the bridge circuit B of a vehicle window lifter can also be utilized for example for actuating an electrochromic glass of a window pane. In one variant, the electrochromic glass and/or its electronic control unit is formed so sluggish that an interruption of the energization for a time period (t2-t1), in which under normal conditions the closure element is adjusted from its maximally open into its maximally closed position, causes almost no change of the degree of transparency of the glass visually perceptible for a user.

Instead of the adjustment of a window pane, a sunroof of a vehicle, a liftgate, a (foldable or also shiftable) side door or sliding door or a convertible top also can be adjusted via the drive motor M of the bridge circuit B.

Furthermore, instead of a window heater S for a window pane a window heater for a rear window (not to be adjusted via the drive motor M) or for a mirror of the vehicle can be controlled via the bridge circuit B.

LIST OF REFERENCE NUMERALS

B, B' bridge circuit
$I_0$ current intensity
M drive motor
S window heater (additional load)
t1, t2, t3, t4 time
T1, T2, T3, T4, T4' transistor

The invention claimed is:

1. An adjustment device for a closure element on a vehicle, wherein the closure element is adjustable between an open and a closed position via the adjustment device, the adjustment device comprising:
   a drive motor; and
   an electronic control unit for adjusting the closure element, the control unit comprising a bridge circuit in order to supply the drive motor with electric power and control the rotational speed and the direction of rotation of a drive element of the drive motor to be coupled with the closure element, wherein:
   the bridge circuit is connected with at least one additional electric load of the vehicle and is formed and provided to control the energization of the at least one additional electric load,
   the bridge circuit comprises four transistors via which in particular a rotation of the drive element of the drive motor in the one or in the other direction of rotation can be controlled depending on the actuation,
   a single one of the four transistors of the bridge circuit is actuatable for energizing the at least one additional electric load and
   only the transistor actuatable for energizing the at least one additional electric load is designed for a larger power consumption than the remaining transistors of the bridge circuit by having a larger current-carrying capacity than the remaining three transistors of the bridge circuit.

2. The adjustment device according to claim 1, wherein the drive motor is interconnected in a bridge branch of the bridge circuit and the at least one additional electric load is connected to the bridge branch.

3. The adjustment device according to claim 1, wherein the bridge circuit is formed and provided to energize the at least one additional electric load when the drive element of the drive motor is driven to rotate in a particular direction of rotation.

4. The adjustment device according to claim 1, wherein the bridge circuit is formed and provided to interrupt an energization of the at least one additional electric load as long as the drive element of the drive motor is driven to rotate in a particular direction of rotation.

5. The adjustment device according to claim 1, wherein the closure element comprises a window pane, a sunroof or a convertible top.

6. The adjustment device according to claim 1, wherein the at least one additional electric load comprises a heating element, in particular a mirror and/or window heater and/or an electrochromic glass.

7. The adjustment device according to claim 4, wherein the at least one additional electric load comprises a heating element in form of an electrochromic glass, wherein the same and/or its electronic control unit is formed such that an interruption of the energization for a time period in which under normal conditions the closure element is adjusted from its closed, in particular a maximally closed position into its open, in particular a maximally open position or vice versa causes no or almost no change of the degree of transparency of the glass visually perceptible for a user.

8. The adjustment device according to claim 1, wherein an individual controller is provided for controlling the drive motor and for controlling the energization of the at least one additional load.

9. An electronic control unit for the power-operated adjustment of a closure element on a vehicle via a drive motor, the control unit comprising a bridge circuit in order to supply the drive motor with electric power and control the rotational speed as well as the direction of rotation of a drive element of the drive motor to be coupled with the closure element, wherein:
   the bridge circuit is connectable with at least one additional electric load of the vehicle and is formed and provided to control the energization of the at least one additional electric load,
   the bridge circuit comprises four transistors via which in particular a rotation of the drive element of the drive motor in the one or in the other direction of rotation can be controlled depending on the actuation, and a single one of the four transistors of the bridge circuit is actuatable for energizing the at least one additional electric load and only the transistor actuatable for energizing the at least one additional electric load is designed for a larger power consumption than the remaining three transistors of the bridge circuit by having a larger current-carrying capacity than the remaining transistors of the bridge circuit.

10. An adjustment device for a closure element on a vehicle, wherein the closure element is adjustable between an open and a closed position by means of the adjustment device and wherein the adjustment device includes a drive motor and an electronic control unit for adjusting the closure element and the control unit comprises a bridge circuit, in order to supply the drive motor with electric power and control the rotational speed and the direction of rotation of a drive element of the drive motor to be coupled with the closure element, wherein the bridge circuit is connected with at least one additional electric load of the vehicle and is formed and provided to control the energization of the at least one additional electric load, the bridge circuit comprises four transistors via which in particular a rotation of the drive element of the drive motor in the one or in the other direction of rotation can be controlled depending on the actuation, wherein the bridge circuit is formed and provided to interrupt an energization of the at least one additional electric load as long as the drive element of the drive motor is driven to rotate in a particular direction of rotation, and wherein the at least one additional electric load comprises a heating element in form of an electrochromic glass, wherein the same and/or its electronic control unit is formed such that an interruption of the energization for a time period in which under normal conditions the closure element is adjusted from its closed, in particular a maximally closed position into its open, in particular a maximally open position or vice versa causes no or almost no change of the degree of transparency of the glass visually perceptible for a user.

\* \* \* \* \*